Patented Oct. 9, 1945

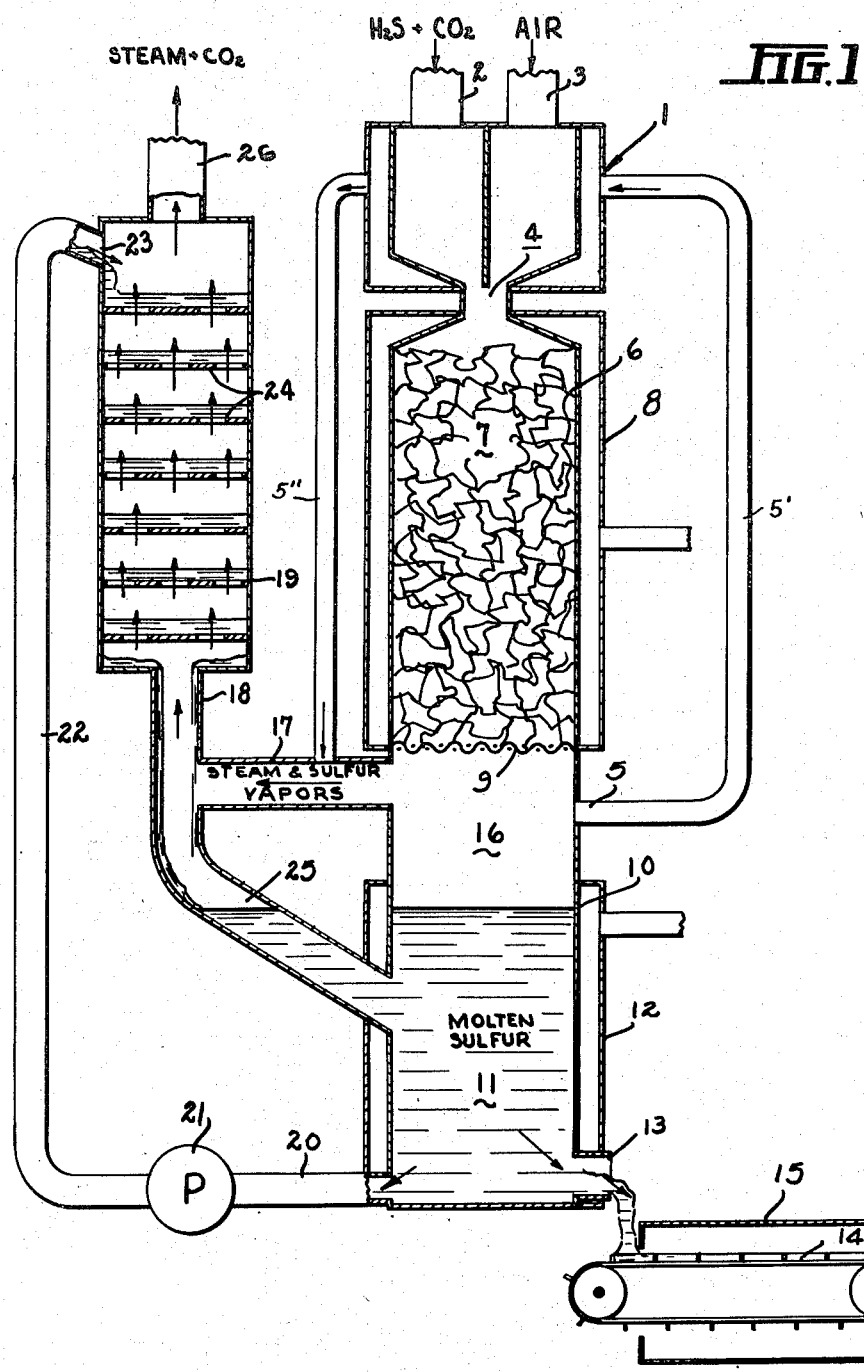

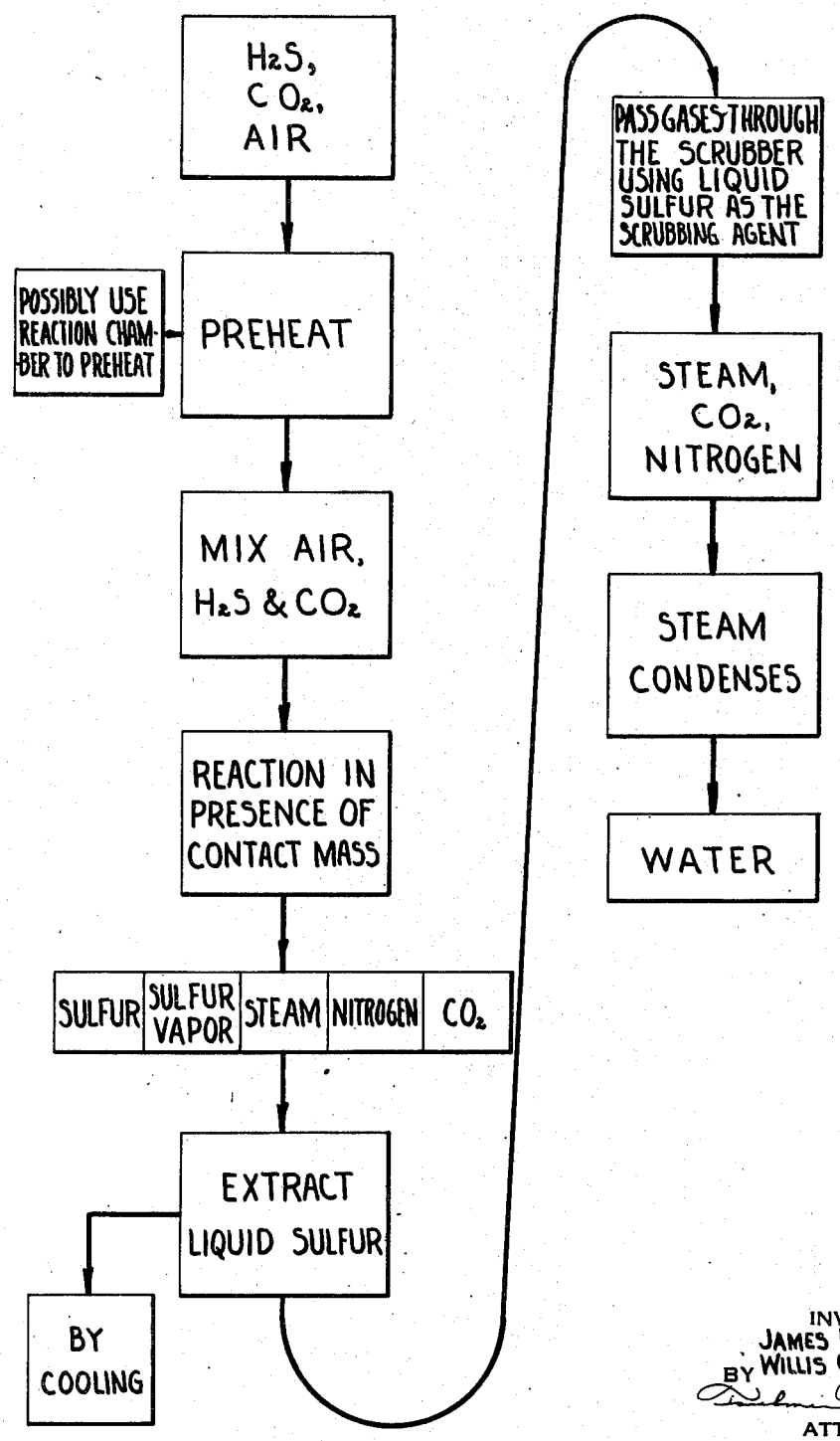

2,386,202

UNITED STATES PATENT OFFICE 2,386,202

METHOD FOR EXTRACTION OF SULPHUR FROM GASES

Willis C. Fernelius and James P. McReynolds, Columbus, Ohio, assignors to Southern Acid & Sulphur Company, Inc., St. Louis, Mo., a corporation of Virginia Application December 1, 1941, Serial No. 421,162

5 Claims. (Cl. 23—225)

It is the object of our invention to provide a method and apparatus for the recovery of sulphur by the oxidation of hydrogen sulphide.

It is our particular object to provide a method and apparatus for the desulphurization of hydrogen sulphide containing gases and the recovery of free sulphur from the main body of the gases and the overrun gases.

It is a further object of this invention to eliminate the steam and admixture gases from the sulphur vapor and the recovery of free sulphur from the input gases.

It is a further object of our invention to remove the sulphur vapors from the overrun gases and recover the sulphur vapors as molten sulphur.

In accordance with this invention, a method is provided for the recovery of free sulphur from sulphur-containing gases by the introduction of air with hydrogen sulphide, either with or without admixture gases, such as nitrogen and carbon dioxide, preferably preheating these gases, and then passing them at a temperature from approximately 500° to 1000° centigrade, over a relatively long and narrow body of porous material forming a contact mass of high surface to volume ratio, and of sufficient length of the packed column so that all mixtures of gas will come in contact with the packing at high rates of gas flow and thereafter cooling the reaction gases to recover molten sulphur. The reaction takes place at a temperature above the boiling point of sulphur, and preferably conducted at a materially increased temperature above that point, that is, in the neighborhood of from 700° to 800° centigrade.

In this reaction phase of the method such an operating temperature is maintained so that the sulphur formed will leave the reaction chamber in vapor state.

The length of the reaction chamber and the diameter thereof are in such relationship that a large volume of packing may be enclosed within a relatively small overall bulk for the reactor.

The apparatus includes a reaction chamber in the form of a tower packed with ceramic bodies maintained at a temperature above the boiling point of sulphur; a condenser for cooling the sulphur vapor, and a collector for recovering the sulphur in liquid form.

In the second phase of the method, a portion of the liquid sulphur is brought in contact with the cooled gases from the condensing chamber in such a way that the liquid sulphur acts as a scrubbing liquid for the removal of sulphur vapor from the gas mixture.

A receiver is provided for the liquid sulphur which drops from the condenser, so that the liquid sulphur produced may be withdrawn as formed, and used for scrubbing the sulphur vapor from the overrun gases from the first phase of the operation in the reaction chamber.

Referring to the drawings:

Figure 1 is a diagrammatic view of a typical apparatus employed for the purpose of this invention.

Figure 2 is a flow diagram showing the several steps of the method.

The apparatus of this invention and the method are used for carrying out the oxidation of hydrogen sulphide to sulphur and water, with oxygen, according to the equation:

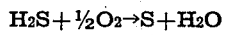

$$H_2S + \tfrac{1}{2}O_2 \rightarrow S + H_2O$$

The oxygen is generally supplied by air introduced into the reaction chamber. The hydrogen sulphide may be pure or diluted with such ingredients as $N_2$, $CO_2$, etc.

Referring to the drawings in detail:

The hydrogen sulphide containing gas supplied through the pipe 2, and air supplied through the pipe 3 into the mixing chamber 4, which is enclosed within a preheating chamber 1. We prefer to use approximately two volumes of hydrogen sulphide to one volume of oxygen as our general rule of action.

Exit gases making their exit at 5, after having passed through the reaction chamber 6, are led through pipe 5' into the preheating chamber 1 and used for preheating purposes and are then returned by pipe 5'' to pipe 17. The preheated hydrogen sulphide and air, with any entrained gases, such as carbon dioxide and nitrogen, are introduced into the reaction chamber 6. This chamber is designed to provide a thorough mixing and heating of all portions of the gas. It is of sufficient length to maintain a given temperature for continuous flow of gas for a given length of time. It contains a contact mass 7 (not necessarily a catalyst) to permit oxidation of a continuous flow of gases at a given temperature for a given length of time. The length and diameter of this column must be in such relationship that a large volume of packing may be enclosed within a relatively small overall bulk for the reactor. The contact mass 7 must have a high surface to volume ratio, and the length of this packed column must be sufficient so that all mixtures of gases will come in contact with the packing. This tower is packed with ceramic bodies 7, preferably consisting of porous, unglazed, broken pottery of such material as Carborundum, or its equivalent, constituting a high contact area, the contact mass resting upon some suitable foraminous support 9.

The reaction chamber 6 is surrounded with a heat interchange jacket 8, to provide a temperature control therefor.

One of the vital features of our invention is the temperature being maintained in the reactor chamber. We maintain temperatures above the boiling point of sulphur so that we have a continuous process. The reaction proceeds at temperatures preferably from 700° to 800° centigrade. The melting point of sulphur is 112° centigrade and the boiling point is 445° centigrade. It is desired to maintain the temperature above the boiling point between the temperatures of 445° to 1000° centigrade. We have found the optimum conditions to be at a temperature of from 700° to 800° centigrade.

The contact mass rests upon some suitable foraminous support 9, so that a part of the sulphur vapor from the reaction chamber 6 will pass into the condensing chamber 16 to be there condensed and then descend as a liquid into the collector 10, where it is collected as at 11. This chamber 10 is surrounded by another chamber 12 which is used with a suitable medium in it to control the temperature of the sulphur collected at 11. The sulphur so collected may be drawn off into a storage tank or directly collected on a continuous conveyor as at the exit 13 and on to the conveyor 14. The temperature at which the sulphur is tapped at 13, and the subsequent rate of cooling on the conveyor 14, will be governed by the kind of sulphur which is desired.

When sulphur is cooled down to 120° to 130° centigrade, it is quite mobile. One of the purposes of so maintaining the sulphur at this temperature, just above its melting point, is that it provides an excellent scrubbing agent for use in the second phase of the process. It provides a plug to control the passage of gases.

*Scrubbing action*

The cooled gases which have water vapor, admixture gases and sulphur vapor entrained, are conducted from the condensing tower through the pipe 17. This body of steam and sulphur vapor rises through the pipe 18 into the bottom of a scrubbing chamber 19. The rising body of sulphur vapor meets a body of liquid sulphur having a temperature of from 120° to 130° centigrade, flowing in the opposite direction the liquid sulphur having been removed from the collecting chamber 10, through the pipe 20, pump 21, and pipe 22, and then discharged into the top of the scrubbing chamber 19 at 23, whence it passes downwardly over suitable scrubbing plates or the equivalent, at 24, encountering the upcoming sulphur vapors, admixture gases and steam, with the result that the sulphur vapors are condensed and picked up by the downwardly moving molten sulphur and returned through the pipe 25 to the molten sulphur reservoir 10. The water vapor and waste gas pass out at the top of the chamber 19 at 26. When sulphur vapor is thus carried by a stream of nitrogen, admixture gases or superheated steam through a scrubber containing liquid sulphur, the sulphur vapor is condensed to the liquid phase. The gases bubble through the layers of molten sulphur and the waste gas leaves the top of the scrubbing chamber 19 at the temperatures indicated between 120° to 165° centigrade.

It is further understood that the reaction in the reaction chamber 7, is above the boiling point of sulphur; the temperature gradient in the chamber 16 runs from about the boiling point of sulphur to just above the melting point; and the temperature in the chambers 11 and 19 is maintained just above the melting point of sulphur.

It is desired to comprehend within the invention and the claims covering it, such variations in temperature as come within these general principles of the invention hereinbefore recited.

Having thus fully described our invention what we claim as new and desire to secure by Letters Patent is:

1. A continuous process for extraction of sulphur from gases comprising the steps of passing a mixture of hydrogen-sulphide and oxygen-containing gas through a reaction chamber and into contact with a mass of non-catalytic heat resistant ceramic bodies to cause a thorough mixing of the gases while the bodies are maintained at a temperature of between 445° and 1000° C., cooling a portion of the reaction gases after they leave the reaction chamber to a temperature between 115° and 165° C., collecting all of the molten sulphur obtained from that portion of reaction gases cooled to the last mentioned range of temperature into a receptacle, leading the overrun gases from the reaction chamber to a scrubbing unit, causing the molten sulphur collected in the receptacle to flow in a countercurrent direction to the stream of overrun gases in said scrubbing unit and collecting all of the molten sulphur from said scrubbing unit.

2. A continuous process for extraction of sulphur from gases comprising the steps of passing a mixture of hydrogen-sulphide and oxygen-containing gas through a reaction chamber and into contact with a mass of non-catalytic heat resistant ceramic bodies to cause a thorough mixing of the gases while the bodies are maintained at a temperature of between 445° to 1000° C., cooling a portion of the reaction gases after they leave the reaction chamber to a temperature between 115° and 165° C., collecting all of the molten sulphur obtained from that portion of reaction gases cooled to the last mentioned range of temperature into a receptacle, leading the overrun gases from the reaction chamber to a scrubbing unit, causing the molten sulphur collected in the receptacle to flow in a countercurrent direction to the stream of overrun gases in said scrubbing unit and collecting all of the molten sulphur from said scrubbing unit, and moving increments of the liquid sulphur through a heated zone to progressively and slowly cool the sulphur thereby solidifying the sulphur and avoiding formation of amorphous sulphur.

3. A continuous process of extraction of sulphur from gases comprising the steps of heating hydrogen-sulphide gas and an oxygen-containing gas, mixing the hydrogen sulphide in an oxygen-containing gas and passing the mixture of hydrogen sulphide and oxygen-containing gas through a reaction chamber and into contact with a mass of non-catalytic heat resistant ceramic bodies to cause a thorough mixing of the gases while the bodies are maintained at a temperature of between 445° to 1000° C., cooling a portion of the reaction gases after they leave the reaction chamber to a temperature between 115° and 165° C., collecting all of the molten sulphur obtained from that portion of reaction gases cooled to the last mentioned range of temperature into a receptacle, leading the overrun gases from the reaction chamber to a scrubbing unit, causing the molten sulphur collected in the receptacle to flow in a countercurrent direction to the stream of overrun gases in said scrubbing unit and collecting all of the molten sulphur from said scrubbing unit.

4. A continuous process for extraction of sulphur from gases comprising the steps of heating a hydrogen sulphide containing gas and heating a separate gas containing oxygen, mixing the heated gases and passing the gaseous mixture through a reaction chamber and into contact with a mass of non-catalytic heat resistant ceramic bodies to cause a thorough mixture of the gases while the bodies are mtaintained at a temperature of between 445° to 1000° C., cooling a portion of the reaction gases after they leave the reaction chamber to a temperature between 115° to 165° C., collecting the molten sulphur obtained from the portion of the gases cooled to the last mentioned temperature range into a receptacle while maintaining the molten sulphur in the last mentioned temperature range, leading the overrun gases from the reaction chamber to a scrubbing chamber, and causing molten sulphur to flow in a countercurrent direction to the stream of overrun gases in said scrubbing chamber, and collecting all of the molten sulphur from said scrubbing unit.

5. A continuous process for extraction of sulphur from gases comprising the steps of heating a hydrogen sulphide containing gas and heating a separate gas containing oxygen, mixing the heated gases and passing the gaseous mixture through a reaction chamber and into contact with a mass of non-catalytic heat resistant ceramic bodies to cause a thorough mixture of the gases while the bodies are maintained at a temperature of between 700° to 800° C., cooling a portion of the reaction gases after they leave the reaction chamber to a temperature btween 115° to 165° C., collecting the molten sulphur obtained from the portion of the gases cooled to the last mentioned temperature range into a receptacle while maintaining the molten sulphur in the last mentioned temperature range, leading the overrun gases from the reaction chamber to a scrubbing unit, causing the molten sulphur to flow downwardly in a countercurrent direction to the stream of overrun gases in said scrubbing chamber, and collecting all of the molten sulphur from said scrubbing unit.

WILLIS C. FERNELIUS.
JAMES P. McREYNOLDS.